United States Patent
Drebing et al.

(10) Patent No.: US 6,224,058 B1
(45) Date of Patent: May 1, 2001

(54) STATIC SEALING ARRANGEMENT

(75) Inventors: Uwe Drebing, Bargteheide; Harald Leisner, Bargteheide, both of (DE)

(73) Assignee: Dichtungstechnik G. Bruss GmbH & Co., Hoisdorf/Hamburg (DE)

( * ) Notice: Subject to any disclaimer, the term of this patent is extended or adjusted under 35 U.S.C. 154(b) by 0 days.

(21) Appl. No.: 09/133,010

(22) Filed: Aug. 12, 1998

(30) Foreign Application Priority Data

Aug. 21, 1997 (DE) .............................. 197 36 431

(51) Int. Cl.$^7$ .............................. E04B 1/682; F02F 11/00
(52) U.S. Cl. .............. 277/313; 277/316; 277/598; 277/934
(58) Field of Search ................ 277/316, 436, 277/438, 440, 502, 551, 560, 575, 591, 598, 642, 644, 934

(56) References Cited

U.S. PATENT DOCUMENTS

| | | | | |
|---|---|---|---|---|
| 2,095,708 | * | 10/1937 | Martin ................................ | 277/934 |
| 2,547,257 | * | 4/1951 | Cole .................................... | 277/575 |
| 3,381,988 | * | 5/1968 | Dewar ................................. | 277/642 |
| 3,921,990 | * | 11/1975 | Johnston et al. .................... | 277/182 |
| 4,052,076 | * | 10/1977 | Wysong . | |
| 4,298,203 | * | 11/1981 | Holzer et al. ....................... | 277/189 |
| 4,418,799 | * | 12/1983 | Hart et al. . | |
| 4,557,491 | * | 12/1985 | Orain .................................. | 277/642 |
| 5,390,939 | * | 2/1995 | Terauchi et al. ................... | 277/934 |
| 5,462,287 | * | 10/1995 | Hering et al. ...................... | 277/575 |
| 5,713,318 | * | 2/1998 | Tausk et al. . | |

\* cited by examiner

Primary Examiner—Anthony Knight
Assistant Examiner—Vishal Patel
(74) Attorney, Agent, or Firm—Carter, Ledyard & Milburn

(57) ABSTRACT

A static sealing arrangement, comprising a strip-shaped seal of elastomeric material pre-installed in a groove formed in a first structural member and having a contact portion which protrudes, when free, and is held tightly pressed against a planar sealing surface of a second structural member is characterized in that the elastomeric material possesses the property of swelling greatly under the influence of the medium to be sealed off and is joined directly to the material of the first structural member by being formed integrally with the same, and the cross sectional profile of the seal is designed to be asymmetrical, having the contact portion offset towards the side facing air of the seal, and the wall of the groove facing the medium projects towards the sealing surface of the second structural member by such a distance, as compared to the wall of the groove which faces air, that the wall facing the medium comes to lie adjacent the sealing surface in the final assembled state of the sealing arrangement.

12 Claims, 2 Drawing Sheets

STATIC SEALING ARRANGEMENT

The instant invention relates to a static sealing arrangement comprising the features as recited in the preamble of claim 1.

Sealing arrangements of the kind in question are suitable for use in sealing valve bonnets of internal combustion engines both when mounted rigidly on the cylinder head or floatingly so as to provide insulation from structure-borne noise. They are likewise suitable as seals for oil sumps in internal combustion engines, heat exchangers, gear transmissions, axles and shafts of motor vehicles and the like.

FIG. 1 illustrates a conventional seal in cross sectional elevation. The shape of the seal is that of an inverted T, having a transverse or cross bar 2 and a stem or vertical bar 3. A rib 4 each projects from the bottom of the cross bar 2 at either side of the plane of symmetry S. The ribs 4 serve to generate pressure peaks against a surface to be sealed off.

FIG. 2 shows the seal when installed in the groove 5 of a valve bonnet 6, the ribs 4 being pressed by means of screws 9 against a planar horizontal sealing surface 7 of a cylinder head 8 in an internal combustion engine. The screws 9 keep a horizontal circumferential flange 10 of the valve bonnet 6 pressed into contact with the sealing surface 7. The seal 1 is shown here, as in FIG. 1, in a free, non-deformed condition in which its total height is greater than the depth of the groove 5 formed in the valve bonnet 6, and the thickness of its vertical bar 3 is smaller than the width of the groove 5. The pressure exerted by the screws, in the assembled state, subjects the seal to such upsetting on the sealing surface 7 of the cylinder head 8, between the bottom of the groove 5 and the lower end of the vertical bar 3 as well as the ends of the ribs 4 formed at the bottom of the transverse bar 2, that the highest local compression occurs at these locations. Sealing thus is obtained substantially along the lines of maximum compression at the head of the transverse bar 2 and the ribs 4, and these lines are closed all along the circumference of the seal. As may be gathered from FIG. 2, the material displaced by the upsetting largely fills the free volume of the groove since the elastomeric material is not compressible.

As a consequence of the sealing mechanism described, with the closed peripheral lines, it is impossible to keep the seal according to FIG. 1 inside the groove such that it will not fall out under the influence of gravity. Mounting a valve bonnet provided with this kind of seal at reasonable cost would not be possible.

Often a way out is chosen by making the cross bar of the T less slender so that it will get caught in the groove. Then the seal is compressed in contact with the sidewalls of the groove. As a rule, the profile thus becomes wedged inside the groove so that the compression which is so important for the sealing function at the top end of the vertical bar of the T hardly can be proven to exist.

The valve bonnet 6 being a molded article, its sidewalls defining the groove must be divergent in the direction of the open end of the groove so as to permit removal from the mold. As a result of this inclination of the mold pressure acts at the places of contact between the seal and the sidewalls of the groove, attempting to push the seal out of the groove.

To overcome that difficulty, the vertical bar of the T was provided at regular intervals with lateral thickened portions extending from the superior foot end of the vertical bar all the way down to the cross bar. This has the disadvantage that insertion of the seal into the groove requires a distinctly greater force at the thickened portions and yet the contact pressure between the upper end of the vertical bar and the bottom of the groove, which pressure is decisive for reliable sealing, is smaller than at the places where no such thickening exists.

When the known seal described above is pressed into the groove the friction between the elastomeric material of the seal and the material of the valve bonnet (metal or impact resistant plastics) must be overcome. During pre-assembly, the seal is upset and it bounces back somewhat when the mounting force is removed. Therefore, it is easy to pull the pre-assembled seal out of the valve bonnet groove, and it may even fall out by itself.

It would be satisfactory from the technical point of view to fix the seal to the valve bonnet by cementing or vulcanizing, but that would be very expensive, especially so because of the pretreatment of the cap with a primer which usually is needed.

The known seal 1 offers a relatively great surface area for attack of the medium. Where the swelling of the elastomeric material under the influence of the medium is great, the effect of the seal may be impaired. For instance, oil may be exuded, the compression may be uneven, resulting in local leaks and the like.

It is, therefore, an object of the invention to provide a sealing arrangement of the kind defined in the preamble of claim 1 with which an elastomeric material can be used that is capable of great swelling and suitable for direct molding of the seal in the groove formed for this purpose in a first structural member, such as a valve bonnet or cap of an internal combustion engine. The seal is to be designed in such a way that the actual swelling is only minor and will not have a deleterious effect on the sealing function.

The object is met by a static sealing arrangement as defined in claim 1.

An elastomeric material of great swelling capability, preferably a silicone rubber of the MVQ type can be used for a sealing arrangement according to the invention because of the configuration of the seal as claimed. This kind of material permits application by direct molding-on to the first structural member which is made in particular of plastics, such as a valve bonnet or cap of an internal combustion engine. The preferred silicone rubber, type MVQ, used for making the seal is very advantageous because of its temperature and oil resistances and also because it adheres well without any primer when the seal is molded on to a valve bonnet or cap made of plastics. A module ready to be installed, with a seal attached to it which cannot get lost, is obtained by a process of joining the seal to a valve bonnet or cap by molding or vulcanizing. This means that additional costs for pretreatment with a primer can be saved since the seal consists of an elastomer of sufficiently great bonding strength to the material of the valve bonnet or cap so that it can be molded integrally with the valve bonnet or cap. The high degree of swelling of the preferred silicone rubber causes no problem in view of the structural design claimed of the sealing arrangement.

The cross sectional profile of the seal is asymmetric, the contact portion being offset towards that side of the seal which faces air. That wall of the groove formed in the first structural member which faces the medium is extended farther towards the sealing surface of the second structural member than the wall of the groove facing air, the extension being selected such that the wall facing the medium comes to lie adjacent the sealing surface when the sealing arrangement is fully assembled. In this manner the seal offers but a very small surface for attack of the medium to be sealed off and that, in turn, at least delays the swelling for quite some time. Especially in cases where rigid compression of the seal between the two structural members is desired, the wall of the groove facing the medium is drawn down until it touches the sealing surface of the second structural member in the final assembled state of the sealing arrangement. Hereby the seal surface area exposed to attack by the medium at the wall facing the medium is reduced practically to zero.

Even if a floating compression of the sealing arrangement is aimed at in order to obtain insulation from structure-borne noise, the remaining gap between the limitation of the groove at the side facing the medium and the sealing surface at the second structural member can be kept so small that the medium can reach the seal at a very small surface area only, whereby swelling is reduced and at least delayed considerably.

It is known that less medium can diffuse into an elastomer subjected to high compressive stress than into stress-relieved material. This effect is utilized purposively with the instant invention in that the seal, on purpose, is compressed clearly more strongly at the side facing the medium than at the side facing air. In this manner an additional barrier is created which is effective to prevent diffusion into the seal of the medium to be sealed off.

At the side of the seal facing air, on the other hand, there is sufficient room to receive the elastomeric material displaced by compression of the sealing arrangement as well as the extra volume of elastomeric material produced by swelling. This helps prevent the generation of additional internal stresses, and only minor reactive forces are generated in the groove of the first structural member during the compression. As a consequence, the bond between the material of the first structural member and the elastomer of the seal is subjected to minor stress so that the adhesive bond is sufficient for reliable functioning of the seal.

An adhesive bond of the kind in question is obtained without any specific pretreatment by simply injecting the silicone rubber (MVQ) of the seal into the groove of the first structural member immediately after the injection molding thereof.

In a sealing arrangement according to the invention the effective compression height of the seal is greater than the distance by which the seal projects in the direction of the sealing surface of the second structural member before the final state of assembly has been reached. This reduces the percentage compression and thus the internal stresses in the seal in spite of the same overlap.

Advantageous modifications of the invention are presented in the subclaims.

The invention will be described further, by way of example, with reference to the accompanying drawings, in which:

FIG. 4a showing a contact portion of the seal still at a distance from the planar sealing surface of a second structural member, while FIG. 4b shows the sealing arrangement in the final compressed state.

Figure 1:
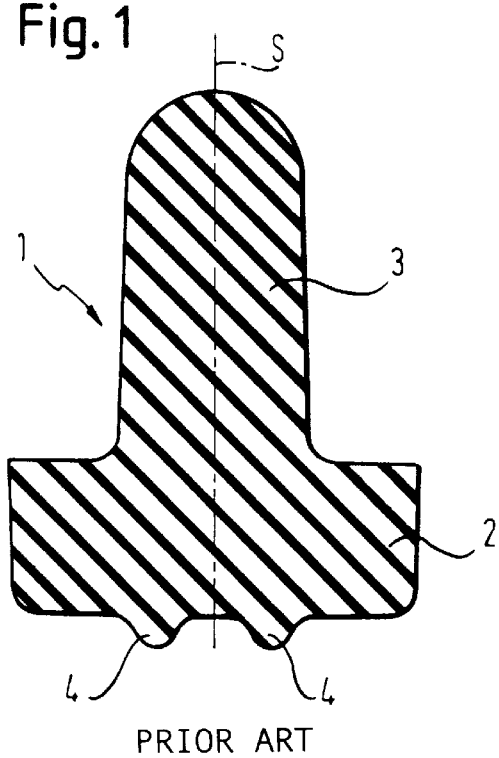
FIG. 1 illustrates the cross sectional profile of a conventional seal made of elastomeric material.
Figure 2:
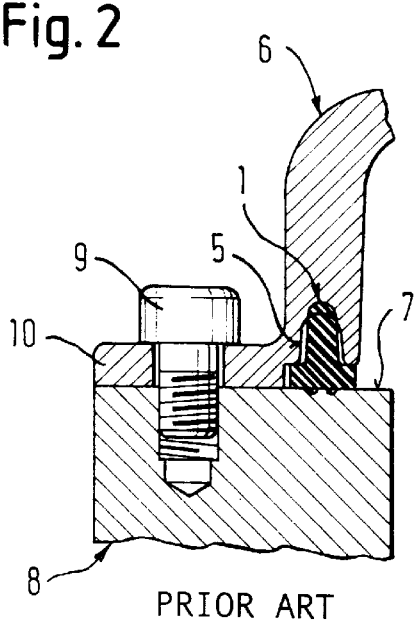
FIG. 2 illustrates a sealing arrangement with a seal as shown in FIG. 1 pressed into a groove of a valve bonnet and held pressed against a sealing surface of a cylinder head by means of screws.
Figure 3:
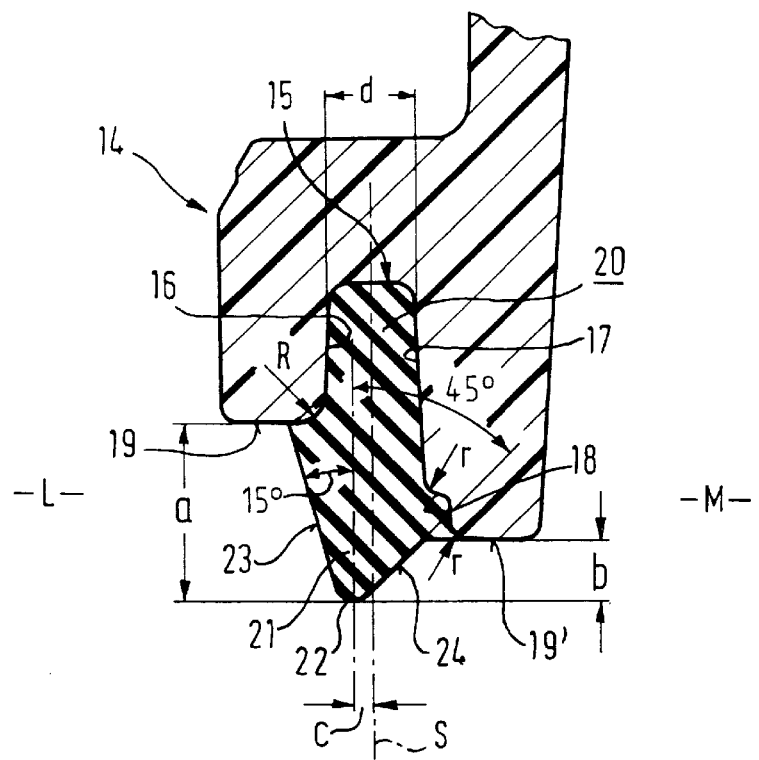
FIG. 3 illustrates the cross sectional profile of a sealing arrangement according to the invention, including an elastomer seal which is injected or vulcanized, for preassembly, into a groove formed in a valve bonnet or cap.

FIG. 3 is a part sectional elevation of the edge of a valve bonnet 14 made of impact resistant plastics and being formed with a groove 15 into which a seal 20 of silicone rubber (MVQ) has been injected immediately subsequent to the injection molding of the valve bonnet. At its side facing air L the groove 15 has a short wall 16, whereas its wall 17 at the side facing the medium M is long and formed with step 18 which is rounded at a small radius r near the lower end of the long wall 17.

The short wall 16 merges by a rounding of great radius R into an end wall 19, whereas the long wall 17 merges by way of a small radius r into an end wall 19' parallel to the end wall 19.

The seal 20 fills the space thus defined and presents a contact portion 21 having a contact tip 22 which is offset with respect to the central plane S of the groove 15 by a distance c in the direction of the short wall 16. The flank 23 of the seal facing air is inclined at an angle of approximately 15° with respect to the central plane S, while the flank 24 facing the medium is inclined at an angle of approximately 45°.

The distance c is of an order of magnitude of between 0.15 d and 0.30 d, where d is the width of the groove 15. The contact tip 22 of the elastomeric seal projects by a distance a beyond the end face 19 and by a distance b beyond the end face 19'. Therefore, the wall 17 of the groove facing the medium is longer than the wall 16 of the groove facing air by the measure of a minus b. The elastomeric material of the seal 20 fills the groove beyond the great rounding of radius R and the small rounding of radius r to wall 19', the radius r corresponding to that of the step 18.

Figure 4A:
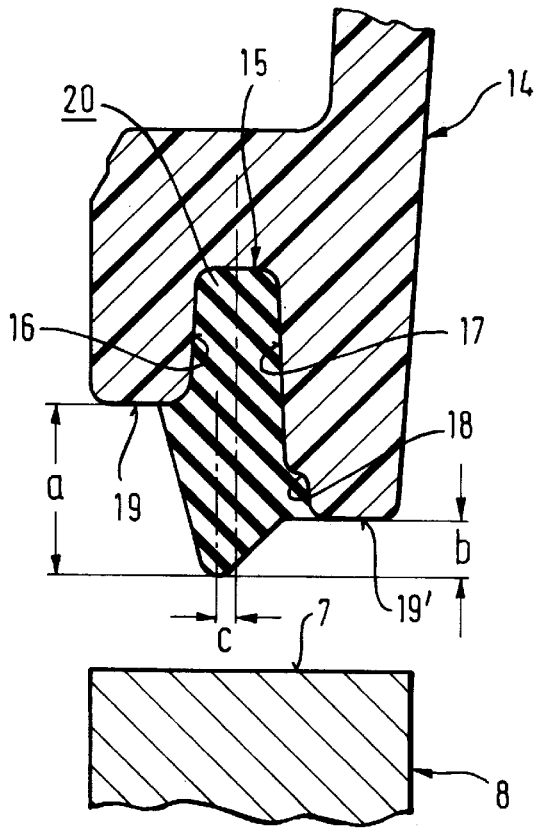
FIGS. 4a and 4b illustrate two steps in the final assembly of a sealing arrangement as presented in FIG. 3.

FIG. 4a demonstrates how the valve bonnet 14 with the seal 20 protruding from it is shifted in the direction of the planar sealing surface 7 of a cylinder head 8, while not yet touching the sealing surface.

Figure 4B:
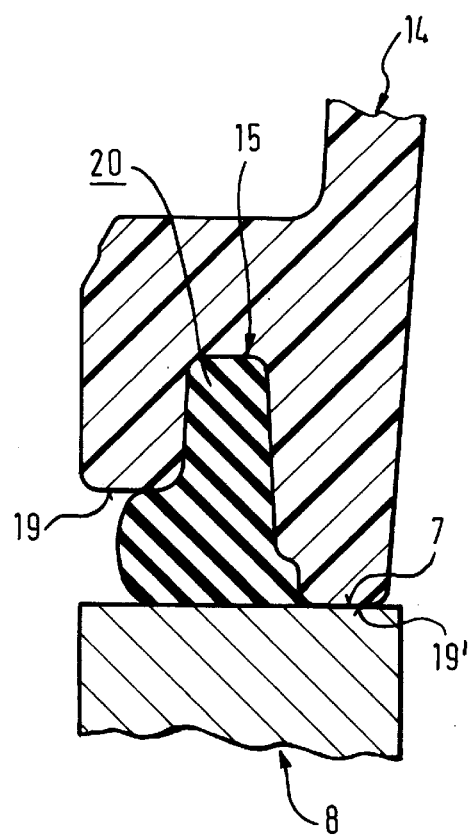

FIG. 4b shows a state where the valve bonnet 14 has been shifted with its end wall 19' all the way into contact with the sealing surface 7, whereby the seal 20 has become deformed as shown, in comparison with its free state. Part of the sealing material has been squeezed out of the groove to the left where there is sufficient room to receive displaced sealing material between the end wall 19 and the planar sealing surface 7.

The end wall 19' of the valve bonnet 14 constitutes a limit for compression as it moves into contact with the planar sealing surface 7. At the same time, the contact between the end wall 19' and the planar sealing surface 7 provides a preliminary seal which dramatically reduces any advance of the medium to be sealed off, oil in the case at issue, towards the side of the seal facing the medium. This, at the same time, causes a delay in time of any swelling of the seal as this cannot begin until oil has reached the side of the seal facing the medium and is able to diffuse into the elastomeric material.

Calculations made by the inventors according to the method of finite elements have demonstrated that the seal according to the invention experiences only very small internal stresses at the bottom of the groove. The course of the maximum values of internal stresses runs almost diagonally from the great radius R at the side facing air L to the small radius r at the edge of the groove 15 facing the medium. As elastomeric material under compressive stress swells less than when in stress-relieved state, the maximum values of the internal stresses present a barrier against the onrushing medium.

FIGS. 3 and 4 illustrate an embodiment with which structure-borne noise can be transmitted because there is contact between the valve bonnet and the cylinder head through the end wall 19' and the sealing surface 7. A floating arrangement must be chosen if the transmission of structure-borne noise is to be avoided. In that event the compressive forces must be selected to be only so great as to leave a small gap between the end wall 19' and the planar sealing surface 7. Such a gap still considerably reduces and delays swelling of the elastomeric material of the seal because the surface area for attack of the medium is kept very small.

The sealing arrangement described above permits simple mounting by a direct mold-on process, avoiding use of a primer, to establish a bond with the lower region of the valve bonnet 14. Furthermore, it makes sure that the elastomer is retained reliably so as not to get lost since the seal 20 adheres to the valve bonnet 14. A seal is obtained which has a long service life and uniform, leakproof sealing effect both when embodied with the rigid compression and the floating compression, if it is desired to avoid transmission of structure-borne noise between the cylinder head and the valve bonnet.

The features disclosed in the specification above, in the figures and claims may be significant for the realization of the invention, both individually and in any desired combination.

What is claimed is:

1. A static sealing arrangement, comprising a seal (20) of elastomeric material pre-installed in a groove (15) formed in a first structural member (14) and having a contact portion (21) which, protruding when free, is held tightly pressed against a planar sealing surface (7) of a second structural member (8), characterized in that the elastomeric material possesses the property of swelling greatly under the influence of the medium (M) to be sealed off and is joined directly to the material of the first structural member (14) by being molded onto the same, and in that the cross sectional profile of the seal (20) is designed to be asymmetrical, having the contact portion (21) offset (c) towards the side facing air (L) of the seal (20), and further characterized in that the amount of offset (c) lies in the range of from 0.15 to 0.30 times the width (d) of the groove (15) formed in the first structural member (14), and in that a first wall (17) of the groove (15) facing the medium projects toward the sealing surface (7) of the second structural member (8) by such a distance (a-b), as compared to a second wall (16) of the groove (15) which faces air, that the first wall (17) facing the medium comes to lie adjacent the sealing surface (7) in the final assembled state of the sealing arrangement.

2. The sealing arrangement as claimed in claim 1, characterized in that the contact portion (21) has a rounded contact tip (22), a flank (23) of the contact portion (21) at the side facing air extending at a steeper flank angle towards the tip than a flank (24) at the side facing the medium.

3. The sealing arrangement as claimed in claim 1, characterized in that an edge (19) of the groove (15) facing air is rounded at a great radius (R).

4. The sealing arrangement as claimed in claim 1, characterized in that the first wall (17) of the groove (15) facing the medium is formed with a step (18) which is rounded at a small radius (r).

5. The sealing arrangement as claimed in claim 1, characterized in that an end wall (19') which limits the first wall (17) of the groove (15) facing the medium is held in contact with the sealing surface (7) of the second structural member (8) in the final assembled state of the sealing arrangement.

6. The sealing arrangement as claimed in claim 1, characterized in that the seal (20) is made of silicone rubber of the MVQ type.

7. The sealing arrangement as claimed in claim 2, characterized in that the flank angle at the side facing air is approximately 15° and the flank angle at the side facing the medium is approximately 45°.

8. A static sealing arrangement, comprising a seal (20) of elastomeric material pre-installed in a groove (15) formed in a first structural member (14) and having a contact portion (21) which protruding when free, is held tightly pressed against a planar sealing surface (7) of a second structural member (8), characterized in that the elastomeric material possesses the property of swelling greatly under the influence of the medium (M) to be sealed off and is joined directly to the material of the first structural member (14) by being molded onto the same, and in that the cross sectional profile of the seal (20) is designed to be asymmetrical, having the contact portion (21) offset (c) towards the side facing air (L) of the seal (20), and in that a first wall (17) of the groove (15) facing the medium projects toward the sealing surface (7) of the second structural member (8) by such a distance (a-b), as compared to a second wall (16) of the groove (15) which faces air that the first wall (17) facing the medium comes to lie adjacent the sealing surface (7) in the final assembled state of the sealing arrangement and further characterized in that an edge (19) of the groove (15) facing air is rounded at a great radius (R).

9. The sealing arrangement as claimed in claim 8, characterized in that the bust wall (17) of the groove (15) facing the medium is formed with a step (18) which is rounded at a small radius (r).

10. The sealing arrangement as claimed in claim 8, characterized in that an end wall (19') which limits the first wall (17) of the groove (15) facing the medium is held in contact with the sealing surface (7) of the second structural member (8) in the final assembled state of the sealing arrangement.

11. The sealing arrangement as claimed in claim 8, characterized in that the seal (20) is made of silicone rubber of the MVQ type.

12. A method of sealing two structural members from a fluid comprising the steps of:

(a) providing a first structural member with a groove;

(b) providing an asymmetrical seal of elastomeric material that swells under the influence of the fluid to be sealed off, where the seal has a contact portion offset toward the side facing air and the offset lies in the range of from 0.15 to 0.30 times the width of the groove;

(c) positioning the seal in the groove of a first structural member whereby a contact portion of the seal protrudes from the groove;

(d) providing a second structural member;

(e) sliding the first structural member into contact with the second structural member such that the contact portion of the seal is tightly pressed against the second structural member;

(f) exposing the seal to the fluid to be sealed off; and (g) swelling the seal in response to the fluid to be sealed off to provide a seal.

* * * * *